United States Patent Office 2,898,194
Patented Aug. 4, 1959

2,898,194

BENEFICIATION OF MAGNESITE ORES

Howard P. Eells, Jr., Cleveland Heights, and Edward P. Pearson and Harley C. Lee, Cleveland, Ohio, assignors, by mesne assignments, to Basic Incorporated, Cleveland, Ohio, a corporation of Ohio No Drawing. Application December 23, 1955
Serial No. 554,947

9 Claims. (Cl. 23—201)

The present invention, relating as indicated to the beneficiation of magnesite ores, has more particular regard to the recovery therefrom of magnesia, either as such or in hydrated form.

Commercial ores of magnesite usually contain as impurities varying amounts of dolomite, calcite and various silicates of magnesium and calcium. Typical of such ores are the crystalline magnesite ores found at Gabbs, Nevada; however similar ores occur near Chewalah in the state of Washington, and Kilmar in the Province of Quebec, as well as in Austria.

When the ore consists of co-existing but discrete crystals of magnesite, dolomite, calcite and silicates, it is possible to separate the magnesite from the impurities by physical and physical-chemical means. In the past such separation has been effected by sink-and-float process and by selective froth flotation. However, processes of the first-mentioned type do not give as complete separation of the magnesia from the impurities as is desirable, and the selective froth flotation method is too complicated and expensive for dealing with ores of the character in hand.

One principal object of the present invention is to provide a new process which will give a substantially complete separation of the magnesia and yet be simple and relatively inexpensive in operation, particularly in dealing with magnesite ores containing from about 1½% to 7% calcium oxide and from about 1½% to 6% silica.

To the accomplishment of the foregoing and related ends, said invention, then, consists of the steps hereinafter fully described and particularly pointed out in the claims, the following description setting forth in detail certain steps embodying the invention, such disclosed steps constituting, however, but several of the various ways in which the principle of the invention may be used.

In general, our present improved process comprises the following steps:

(1) Calcination of the crushed magnesite ore at temperatures of 1300–1650° F. for a sufficient length of time, that the percentage of ignition loss of the calcine is from 0.8 to 1.4 times the calcium oxide (CaO) in the calcine.

(2) Hydration of the calcine by treatment with either steam or water. The hydration is most conveniently effected by agitating the calcine while adding steam or water, at temperatures between 140 and 350° F. At such temperatures the necessary degree of hydration takes place in about 30 minutes to about 2 hours. The resulting material should be substantially free of excess water.

(3) Separation by pneumatic or by pneumatic and mechanical classification or by screening the finer particles of calcine and the calcined, hydrated magnesite from the coarser and essentially unaltered silicates and from the coarser, uncalcined or partially calcined dolomite and calcite grains.

The aim of the controlled calcination is to effect a conversion of the magnesite, $MgCO_3$ grains, essentially all to magnesium oxide, $MgO$, while leaving the dolomite grains $MgCO_3 \cdot CaCO_3$ with only the $MgCO_3$ component converted to $MgO$ and any calcite essentially uncalcined. At these temperatures the anhydrous silicates remain unaltered, while the hydrous silicate grains may lose all or part of their component water with an attendant hardening and densification. These changes render the original magnesite grains susceptible to hydration while the original dolomite, calcite, and silicate grains remain hard and unamenable to hydration.

Disintegration is effected by the hydration step wherein the conversion of the $MgO$ to $Mg(OH)_2$ causes bursting as commonly seen in the hydration of quicklime. The partially calcined grains of dolomite and the silicate grains are essentially unaffected by the hydration step. It is to be seen that the two steps of calcination and hydration yield a mixture containing small particles of $Mg(OH)_2$ along with some unhydrated $MgO$ and much coarser particles of calcite, partially altered dolomite and of essentially unaltered silicates of calcium and/or magnesium. Such a mixture can be easily separated by mechanical screening or by pneumatic and/or mechanical classification, or by air tabling, into a fine fraction consisting essentially of $Mg(OH)_2$, with accompanying $MgO$, and a coarse fraction containing a high concentration of all the impurities.

Prior to calcination, the magnesite ore is crushed to a moderately coarse size, preferably where the top size is in the range of ¼ inch to 2 inches. In some instances, where the crushed ore bears a considerable quantity of finely sized impurities such as clay, talc or micaceous particles, it will be found advantageous during or after crushing, to screen the ore at some suitable mesh, for instance, from 8 to 20 mesh (U.S. Standard) and to discard the finer fraction bearing the fine-grained impurities. The crushing should be carried out so as to form a minimum amount of finely sized dolomites and silicates which would later be carried into the fine magnesia concentrate.

The calcination step can be conducted either batchwise or continuously in any suitable furnace in which the temperature and retention period can be adequately controlled. Batch calcinations have been carried out in furnaces heated electrically and provided with either manual or automatic temperature control. Continuous calcinations have been conveniently made in multiple-hearth roasters of the Herreshoff type, provided with oil-fired combustion chambers on a number of the lower hearths. The firing was hand-controlled according to the furnace gas temperature measurements on the various hearths. It has been found that the temperature of calcination can be varied between 1300° and 1650° F. depending upon the size and nature of the ore and the time of heating. The material should be held within the above temperature range for periods of 30 minutes up to 6 hours, depending upon the calcination temperature, the size and nature of the ore and the efficiency of the rabbling of the crushed ore to bring it into contact with the furnace gases. The calcination period is varied inversely as the calcination temperature, so as to attain the desired final degree of calcination, with the percentage of residual ignition loss being equivalent to from 0.8 to 1.4 times the calcium oxide (CaO) in the calcine.

If the calcine is underburned because of too low temperatures or too short a calcination time, the magnesia recovery will be diminished. If the calcine is overburned from too high a temperature or too long a calcination period, the fine concentrate will contain excessive amounts of calcium oxide, resulting from the calcination and hydration of some of the dolomite and calcite grains.

Batch-wise calcinations have been made satisfactorily at temperatures between 1300° and 1550° F. For practical periods of calcination of two to four hours, and using magnesite crushed to pass a sieve with a one-half inch opening, the preferred temperature range is 1350° to 1450° F. In the continuous operations in a Herreshoff roaster, wherein the ore is crushed to about ⅝″ maximum thickness and the retention period ranges from 2 to 4 hours and wherein the calcination period is approximately one-half the total retention time in the roaster, the desired temperature range is 1350° to 1650° F., to produce a residual ignition loss as required by the above formula.

The hydration of the calcine can be carried out in any commercial lime hydrator or adequate mixer wherein either steam or water can be dispersed throughout the mass of calcine. The hydration should be in the "dry" manner that is, the hydrating solids should remain dry to the touch and pulverulent. The hydration can be effected at either atmospheric pressure or at elevated pressures. Pressures ranging from atmospheric up to 60 p.s.i. gauge have been found satisfactory. The efficiency of the process is not dependent upon the use of elevated pressures. Hydration at atmospheric pressure can be carried out at temperatures from 140° F. up to at least 350° F. The upper limit is that temperature at which $Mg(OH)_2$ dissociates under the atmospheric conditions of the hydration step. A preferred range is 200–300° F. as the reaction proceeds rapidly and smoothly in this range. If the calcine becomes cold during storage, the temperature of the agitated mass may be raised by either heating the walls of the hydrator or by injecting steam directly into the calcine. If the hydrator is properly insulated, the heat of reaction is sufficient to maintain a suitable hydration temperature in either batchwise or continuous hydration. If water instead of steam is used for hydrating, care must be taken to introduce it into the preheated calcine at a rate not exceeding that of its consumption in the hydration reaction, otherwise, the mass may become wet and pasty, or set to lumps that cannot be treated in the subsequent separation step. At temperatures of 200–300° F. sufficient hydration takes place in 40 to 60 minutes. At lower temperatures, longer hydration times will be required. Long hydration periods do not adversely affect the efficiency of the final separation. The hydration should be of sufficient intensity to increase the ignition loss of the calcine by 3 to 25% in the hydrate.

The degree of hydration is not highly critical, as it appears that even a moderate degree of hydration serves to disintegrate the coarse grains of calcined magnesite. An adequate beneficiation of the magnesia has been affected where as little as 18% of the magnesia derived by calcination of the $MgCO_3$ has been hydrated. More complete hydration or a full conversion of the MgO to $Mg(OH)_2$ is entirely satisfactory and in some instances, depending on the nature of the ore, more complete hydration may be found desirable.

The finely-sized, hydrated magnesia fraction may be separated from the coarse fraction by either screening or by pneumatic or by pneumatic and mechanical classification. The choice of method will depend on the desired limits of CaO and $SiO_2$ in the concentrate and upon the overall economics of capital investment and operating costs. Any one of the methods, properly conducted, will give efficient separations. Shown below are the compositions of the various screen fractions of a typical calcined and hydrated material:

COMPOSITION OF SIEVE FRACTIONS (IGNITION FREE BASIS)

| Mesh | Wt. of Sieve Fraction, percent | MgO, percent | CaO, percent | Acid Insoluble, percent | $Fe_2O_3$ + $Al_2O_3$, percent |
|---|---|---|---|---|---|
| +3 | 7.0 | 47.9 | 35.8 | 13.5 | 2.8 |
| −3+6 | 6.4 | 62.4 | 25.2 | 10.4 | 2.0 |
| −6+8 | 3.1 | 62.7 | 28.1 | 7.7 | 1.5 |
| −8+12 | 4.4 | 65.8 | 25.9 | 6.7 | 1.6 |
| −12+20 | 5.1 | 72.5 | 19.6 | 6.2 | 1.7 |
| −20+50 | 8.4 | 85.3 | 9.6 | 3.9 | 1.2 |
| −50+100 | 13.4 | 89.9 | 6.4 | 2.6 | 1.1 |
| −100 | 52.2 | 93.0 | 4.3 | 1.8 | 0.9 |

The large proportions of minus 100 mesh and minus 50 mesh materials and their higher purity are to be noted. The data also indicate that a product of middling grade may be obtained by separating out a product of intermediate size, thus other examples shown later indicate that the middling separation might be as coarse as minus 8 plus 50 mesh.

For the production of a concentrate of high quality and at a practical recovery efficiency, separations at 50 to 100 mesh have been found preferable. Separation by screening can be effected on any high intensity screening machine such as the Tyler "Hummer" Pneumatic and mechanical classification can be accomplished by means of an air classifier such as the Raymond "Whizzer" or Sturtevant "Whirlwind." Dry tabling with air agitation will also give an efficient separation. Pneumatic separation may be effected in a Hardinge loop classifier with the fine fraction being collected in a cyclone collector or bag filter.

The fine concentrate may be used as such for many purposes. For other needs, it can be re-calcined to the oxide state.

Several examples of the process taken from laboratory and pilot-scale tests with typical results are shown below.

In addition to the laboratory test described in the first of the following examples, five pilot plant scale tests are described in Examples 2–6 inclusive. In these latter tests, Gabbs Valley, Nevada, magnesite ores of different qualities were fed into a commercial Herreshoff roaster. The ores are retained in the roaster for two to three hours while the hottest hearth temperature ranged from 1470° to 1650° F. The calcines of varying ignition losses, lime and silica contents, were subjected to further treatment as set forth in Examples 2–6 inclusive. In each example the composition of the calcined head sample was calculated from the weight proportions and compositions of the rejects, middlings and concentrates.

*Example 1*

In this example a magnesite ore was used which had an ignition loss of approximately 49.6% and had a chemical composition on an ignition-free basis of MgO 86.7%, CaO 9.2%, acid insolubles 3.0% and $Al_2O_3 + Fe_2O_3$ 1.1%. A portion of this ore was crushed to pass essentially through a screen with a ½" square opening, and a 16-pound portion was heated in a shallow layer in a Globar furnace for 2 hours at 1550° F., to give a calcine having an ignition loss of 17.6%. During the calcination the charge was rabbled at 10 minute intervals. A 2-pound portion of the calcine was then hydrated for 4 hours with atmospheric steam. During hydration the material was continuously agitated by a mechanical stirrer. The temperature of the hydrating mass rose to approximately 300° F. The resulting hydrate had an ignition loss of 22.3%. This material was separated by means of a 12 mesh sieve into a fine and a coarse tailing. The latter comprised 20% of the hydrated sample and had an ignition loss of 32.0% and a chemical composition on an ignition-free basis of MgO 74.1%, CaO 20.1%, acid insolubles 4.3% and $Al_2O_3 + Fe_2O_3$ 1.5%. The fine or −12 mesh fraction was separated by means of a Raymond laboratory whizzer into a coarse and a fine fraction. The coarse fraction contained approximately 25% of material finer than 100 mesh, while the fine fraction contained only 5% of material coarser than 100 mesh. The coarse fraction which comprised 4% of the initial hydrated sample, had an ignition loss of 33.5%. Its chemical composition on an ignition-free basis was MgO 66.2%, CaO 22.9%, acid insolubles 8.7% and $Al_2O_3 + Fe_2O_3$ 2.3%. The fine product from the whizzer comprised 76% of the initial hydrated feed, and had an ignition loss of 19.0% with a chemical composition on an ignition-free basis of MgO 90.5%, CaO 6.1%, acid insolubles 2.5% and $Al_2O_3+Fe_2O_3$ 1.0%.

Example 2

Approximately 230 lbs. of a calcine having an ignition loss of 3.5% and a chemical composition on an ignition-free basis of MgO 88.8%, CaO 4.2%, acid insolubles 5.4% and $Al_2O_3+Fe_2O_3$ 1.7% was hydrated for 1 hour with atmospheric steam in a steam-jacketed pug-mill. The temperature of the material rapidly rose to 290° F. The final hydrate had an ignition loss of 8.9%. After hydration the product was screened on an 8 mesh and a 70 mesh screen to form a +8 mesh coarse reject, a −8+70 mesh middling and a −70 mesh concentrate. The +8 mesh reject constituted 8.5% of the total hydrated feed, and had an ignition loss of 10.6%. It had a chemical composition on an ignition-free basis of MgO 67.7%, CaO 8.1%, acid insolubles 19.6% and $Al_2O_3+Fe_2O_3$ 4.7%. The −8+70 mesh middling constituted 20.7% of the hydrated feed. It had an ignition loss of 12.0% and a chemical composition on an ignition-free basis of MgO 81.4%, CaO 7.3%, acid insolubles 9.2% and $Al_2O_3+Fe_2O_3$ 2.1%. The −70 mesh concentrate made up 70.8% of the original hydrated feed. Its ignition loss was 7.8% and the chemical composition on an ignition-free basis was MgO 93.5%, CaO 2.9%, acid insolubles 2.6% and $Al_2O_3+Fe_2O_3$ 1.0%.

Example 3

In this test a calcine was used which had an ignition loss of 7.5% and a chemical composition on an ignition-free basis of MgO 88.4%, CaO 6.0%, acid insolubles 4.4% and $Al_2O_3+Fe_2O_3$ 1.2%. 288 lbs. of this calcine were hydrated in a steam-jacketed pug-mill for 1 hour, during which period the material attained a temperature of 290° F. The hydrated product with an ignition loss of 13.1% was screened over a 12 mesh sieve to yield a coarse reject and a fine fraction which was fed to a 30″ Raymond whizzer mechanical separator, at the rate of 830 lbs. per hour. The +12 mesh reject constituted 22% of the hydrated feed and had an ignition loss of 18.0%. The chemical composition on an ignition-free basis was MgO 76.6%, CaO 13.1%, acid insolubles 8.8% and $Al_2O_3+Fe_2O_3$ 1.5%. The coarse whizzer middling contained 91% of material coarser than 100 mesh while the fine fraction contained only 5% of material coarser than 100 mesh. The coarse middling from the whizzer separation constituted 17% of the hydrated feed. It had an ignition loss of 15.7% and a chemical composition on an ignition-free basis of MgO 82.8%, CaO 8.9%, acid insolubles 6.6% and $Al_2O_3+Fe_2O_3$ 1.7%. The fine concentrate from the separation constituted 61% of the total hydrated feed and had an ignition loss of 9.5%. Its chemical composition on an ignition-free basis was MgO 93.6%, CaO 3.0%, acid insolubles 2.4% and $Al_2O_3+Fe_2O_3$ 1.0%.

Example 4

The calcine used in this test had an ignition loss of 6.5% and a chemical composition on an ignition-free basis of MgO 89.2%, CaO 5.5%, acid insolubles 4.1% and $Al_2O_3+Fe_2O_3$ 1.2%. Approximately 300 lbs. of this material was placed in a steam-jacketed pug-mill and heated to approximately 190° F. by means of the steam jacket. Water was then added to the mass at short intervals for 3 hours to yield a hydrated product with an ignition loss of 28.7%. The hydrate was first screened on a 12 mesh sieve to produce a 12 mesh coarse reject and a −12 mesh intermediate that was fed to a 30″ Raymond whizzer separator at the rate of 830 lbs. per hour. The +12 mesh reject constituted 22% of the hydrated feed and had an ignition loss of 23.3%. It had a chemical composition on an ignition-free basis of MgO 80.6%, CaO 10.4%, acid insolubles 7.2% and $Al_2O_3+Fe_2O_3$ 1.8%. The coarse whizzer product contained 64% of +100 mesh material while the whizzer fine fraction contained 2% of + 100 mesh material. The coarse whizzer fraction constituted 22% of the hydrated feed and had an ignition loss of 25.1%. It had a chemical composition on an ignition-free basis of MgO 86.9%, CaO 6.6%, acid insolubles 5.2% and $Al_2O_3+Fe_2O_3$ 1.3%. The fine whizzer concentrate constituted 56% of the hydrated feed and had an ignition loss of 25.4%. The chemical composition on an ignition-free basis was MgO 93.5%, CaO 3.2%, acid insolubles 2.4% and $Al_2O_3+Fe_2O_3$ 0.9%. It is to be noted that the ignition losses reported for the sized fractions are less than that of the hydrated sample. This is probably due to a few percent of free moisture existing in the hydrated sample prior to separation. This free moisture was lost during the screening and whizzer separation steps.

Example 5

A quantity of calcine having an ignition loss of 6.9% and a chemical composition on an ignition-free basis of MgO 88.5%, CaO 6.3%, acid insolubles 3.4% and $Al_2O_3+Fe_2O_3$ 1.8% was hydrated for 1½ hours with atmospheric steam in a steam-jacketed pug-mill. The final hydrate had an ignition loss of 10.4%. After hydration, 3,125 pounds of the product were separated in a 30″ Raymond whizzer into a coarse reject and a fine concentrate. The coarse reject, which constituted 55% of the total hydrated feed, had an ignition loss of 14% and a chemical composition on an ignition-free basis of MgO 84.6%, CaO 9.0%, acid insolubles 4.5% and $Al_2O_3+Fe_2O_3$ 1.9%. The fine fraction constituted 45% of the total hydrated feed and had an ignition loss of 7.5%. Its chemical composition on an ignition-free basis was MgO 92.7%, CaO 3.4%, acid insolubles 2.3% and $Al_2O_3+Fe_2O_3$ 1.6%.

Example 6

A quantity of calcine with an ignition loss of 6.5% and a chemical composition on an ignition-free basis of MgO 88.3%, CaO 6.2%, acid insolubles 4.3% and $$Al_2O_3+Fe_2O_3$$

1.2% was hydrated for 1½ hours with atmospheric steam in a steam-jacketed pug-mill. The hydrated material, which had an ignition loss of 11.9% was separated by means of a 12 mesh sieve into a coarse and a fine fraction. The coarse +12 mesh fraction constituted 22% of the hydrated feed to the sieve. It had an ignition loss of 18.8% and a chemical composition on an ignition-free basis of MgO 74.9%, CaO 14.9%, acid insolubles 8.3% and $Al_2O_3+Fe_2O_3$ 1.9%. The −12 mesh concentrate constituted 78% of the feed to the sieve. It had an ignition loss of 10.3% and a chemical composition on an ignition-free basis of MgO 91.6%, CaO 4.0%, acid insolubles 3.4% and $Al_2O_3+Fe_2O_3$ 1.0%.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. In a method for obtaining magnesia in hydrated form from magnesite or containing as impurities varying amounts of dolomite, calcite and silicates of magnesium and calcium, the steps which comprise heating such ore crushed to a top size not exceeding 2 inches at a temperature from about 1300° F. to about 1650° F., whereby the magnesite and the magnesium carbonate component of any dolomite present are calcined but any calcite present is left substantially uncalcined, adding sufficient water to the entire calcined material preferentially to hydrate only magnesium oxide and convert it to a substantially dry pulverulent hydrate, and then separating the resulting fine, substantially dry, hydrated magnesia, together with any accompanying unhydrated magnesia, from the remainder of the material.

2. In a method for obtaining magnesia in hydrated form from magnesite ore containing as impurities varying amounts of dolomite, calcite and silicates of magnesium and calcium, the steps which comprise crushing such ore to a top size in the range of ¼ inch to 2 inches, passing the crushed ore over a screen of from 8 to 20 mesh, heating the screened ore at a temperature from about 1300° F. to about 1650° F., whereby the magnesite and the magnesium carbonate component of any dolomite present are calcined but any calcite present is left substantially uncalcined, hydrating the calcined material to convert the magnesium oxide to pulverulent magnesium hydroxide without excess of water, while leaving the partially calcined dolomite and the calcite and silicates as coarse durable particles, and then separating the resultant fine hydrated magnesia from the remainder of the material.

3. In a method for obtaining magnesia in hydrated form from magnesite or containing as impurities varying amounts of dolomite, calcite and silicates of magnesium and calcium, the steps which comprise selectively calcining such ore crushed to a top size not exceeding 2 inches from a temperature of about 1300° F. to about 1650° F. to effect a conversion to magnesium oxide of the magnesite and the magnesium carbonate component of any dolomite present, but leaving any calcite essentially uncalcined, disintegrating the magnesium oxide to particulate form by hydrating the calcined material to convert the magnesium oxide to a hydrated form without excess of water, and then screening the finer particles of calcine and hydrated magnesium oxide from the coarser, essentially unaltered silicates and from the coarser, uncalcined or partially calcined dolomite and calcite grains.

4. In a method for obtaining magnesia in hydrated form from magnesite ore containing as impurities varying amounts of dolomite, calcite and silicates of magnesium and calcium, the steps which comprise heating such ore crushed to a top size not exceeding 2 inches at a temperature from about 1300° F. to about 1650° F. for a sufficient time to produce an ignition loss of from 0.8 to 1.4 times the percentage of calcium oxide in the calcine and provide magnesium oxide while leaving any calcite essentially uncalcined, adding sufficient water to the entire calcined material preferentially to hydrate only magnesium oxide and convert it to a dry pulverulent hydrate, and then separating the resulting fine, substantially dry, powdery hydrated magnesia, together with any accompanying unhydrated magnesia, from the remainder of the material.

5. In a method for obtaining magnesia in hydrated form from magnesite ore containing as impurities varying amounts of dolomite, calcite and silicates of magnesium and calcium, the steps which comprise selectively calcining such ore crushed to a top size not exceeding 2 inches from a temperature of about 1300° F. to about 1650° F. to effect a conversion to magnesium oxide of the magnesite and the magnesium carbonate component of any dolomite present, but leaving any calcite essentially uncalcined, hydrating the magnesium oxide in the presence of the entire calcined material at from about 140° to 350° F. to a substantially dry pulverulent form, and then separating the resulting fine, substantially dry, hydrated magnesia, together with any accompanying unhydrated magnesia, from the remainder of the material.

6. In a method for obtaining magnesia in hydrated form from magnesite ore containing as impurities varying amounts of dolomite, calcite and silicates of magnesium and calcium, the steps which comprise crushing such ore to a top size in the range of ¼ inch to 2 inches, passing the crushed ore over a screen of from 8 to 20 mesh, heating the screened ore at a temperature from about 1300° F. to about 1650° F. for a sufficient time to produce an ignition loss of from 0.8 to 1.4 times the percentage of calcium oxide in the calcine and provide magnesium oxide while leaving any calcite essentially uncalcined, hydrating the magnesium oxide preferentially in the presence of the entire calcined material at from about 140° to 350° F. for 0.5 to 2 hours to produce a substantially dry pulverulent hydrate, and then separating the resulting fine, substantially dry, hydrated magnesia, together with any accompanying unhydrated magnesia, from the remainder of the material.

7. A method for recovering magnesium concentrate from a magnesite ore containing as impurities dolomite, calcite, and silicate ingredients, comprising the steps of heating such ore when crushed to provide a top size not exceeding 2 inches at a temperature within the range of about 1300° F. to about 1650° F. to convert at least some of the magnesium compounds present to magnesia while leaving substantially unaffected the remaining ingredients of the ore, hydrating the magnesia in the presence of the uncalcined ore ingredients and impurities with water while avoiding an excess of said water to disintegrate the magnesia and form a pulverulent substantially dry magnesia hydrate, and then separating the magnesia hydrate from the remainder of the ore.

8. A method for recovering a magnesium concentrate from a magnesite ore containing as impurities dolomite, calcite, and silicate ingredients, comprising the steps of crushing such ore to a top size not exceeding 2 inches at a temperature within the range of about 1300° F. to about 1650° F. to convert at least some of the magnesium compounds present to magnesia while leaving substantially unaffected the remaining ingredients of the ore, hydrating the magnesia in the presence of the uncalcined ore ingredients and impurities with water while avoiding an excess of said water to hydrate and disintegrate more readily the magnesia derived from the magnesite than any magnesia derived from the dolomite and thereby to form a pulverulent substantially dry magnesia hydrate, and then separating the magnesia hydrate from the remainder of the ore.

9. A method for recovering magnesia from a naturally occurring magnesite ore containing as impurities dolomite, calcite, and the hydrous and anhydrous silicates of magnesium and calcium, comprising the steps of crushing the ore to a top size not exceeding 2 inches, heating the crushed ore at a temperature in the range of about 1300° F. to about 1650° F. for a sufficient time to produce an ignition loss of from 0.8 to 1.4 times the percentage of calcium oxide in the calcine and to convert at least some of the magnesium carbonate to magnesia and to dehyrate the hydrous silicates, said heating step also hardening and densifying said silicates and thereby rendering only the magnesia susceptible to a hydration step, adding sufficient water to the calcined mixture at a temperature in the range of about 140° F. to about 350° F. and for about 0.5 hour to about 2 hours to hydrate only the magnesia and to disintegrate the magnesia so formed and thereby provide without attrition a pulverulent dry hydrate, and separating the dry hydrate from the calcine so selectively hydrated.

References Cited in the file of this patent

UNITED STATES PATENTS

| | | |
|---|---|---|
| 1,863,966 | Brosche | June 21, 1932 |
| 1,894,184 | Loomis | Jan. 10, 1933 |
| 2,097,054 | Atwood | Oct. 26, 1937 |
| 2,155,139 | MacIntire | Apr. 18, 1939 |
| 2,359,792 | Rex | Oct. 10, 1944 |
| 2,384,008 | Brandenburg | Sept. 4, 1945 |
| 2,491,033 | Byrns et al. | Dec. 13, 1949 |
| 2,694,620 | Lathe | Nov. 16, 1954 |